United States Patent

Stokes

[15] 3,663,350
[45] May 16, 1972

[54] MEMBRANE SYSTEM

[72] Inventor: William S. Stokes, 18655 Clark, Apt. 23, Tarzana, Calif. 91356

[22] Filed: Jan. 12, 1970

[21] Appl. No.: 2,075

[52] U.S. Cl. ..............................161/151, 52/309, 161/254, 161/255, 161/256, 161/402
[51] Int. Cl. ..................B32b 13/12, B32b 25/08, E04c 1/24
[58] Field of Search..................161/57, 58, 87, 88, 89, 92, 161/93, 94, 95, 96, 111, 112, 113, 114, 115, 143, 144, 151, 156, 170, 203, 402, DIG. 4; 52/309, 515, 516

[56] References Cited

UNITED STATES PATENTS

| | | | |
|---|---|---|---|
| 2,653,118 | 9/1953 | Seymour | 161/93 |
| 3,297,461 | 1/1967 | Siddall | 161/89 |
| 2,342,556 | 2/1944 | Rockoff | 18/59 |
| 3,001,213 | 9/1961 | Stark et al. | 161/94 |
| 2,690,769 | 10/1954 | Brown | 161/242 |
| 2,893,908 | 7/1959 | Antlfinger | 161/254 |
| 3,553,073 | 1/1971 | Rausing et al. | 161/252 |

Primary Examiner—William A. Powell
Assistant Examiner—James J. Bell
Attorney—Flam & Flam and Howard A. Silber

[57] ABSTRACT

A leakproof membrane system including an outer sheet of fluid impervious, compression set resistant, synthetic polymer resin, a synthetic fiber scrim completely imbedded within the outer sheet, and an elastomeric layer coextensive with and adhesively bonded to the outer sheet. The elastomeric layer comprises an oriented rubber having preferred resilience within the plane of the layer. When installed on a substrate, fluid leakage to the substrate is prevented by the membrane system. Further, the elastomeric layer provides a "slip-sheet" effect, isolating the membrane outer sheet from movement or cracking of the substrate.

14 Claims, 2 Drawing Figures

Patented May 16, 1972

3,663,350

INVENTOR.
WILLIAM S. STOKES
BY
Hinderstein & Silber
ATTORNEYS

MEMBRANE SYSTEM

BACKGROUND OF THE INVENTION

1. Field of the Invention

The present invention relates to a fluid impervious membrane system, and more particularly to a laminated membrane system including a fluid impervious outer sheet, a scrim imbedded within the outer sheet, and an elastomeric layer adhesively bonded to the outer sheet.

2. Description of the Prior Art

There has been a longstanding need in the building and construction industry for a satisfactory waterproofing system for roof, decks and other surfaces. Clearly, such a system must completely prevent water or other fluids from intruding into or through the deck or roof. In addition, such a system should be capable of withstanding heavy, compressive loads, should resist the degrading effects of oil, grease, gasoline and the like, should compensate for thermal expansion, contraction and concomitant cracking of the roof or deck substrate, and should be easy to repair.

These system requirements are illustrated by a typical application, that of waterproofing the surface of a rooftop parking deck on an apartment house or commercial building. Generally, such a parking deck will comprise a concrete floor of large area, supported on pillars, with low perimeter walls and no overhead covering. The waterproofing system thus is continuously exposed to the elements, and as a first requirement, must prevent rain water and melting ice or snow from leaking through to apartments or offices within the building. This capability should not be reduced by extended exposure to the elements, by daily and seasonal temperature changes or by the prolonged effect of sunlight.

A waterproofing membrane installed on a parking deck also is subjected to the forces of spinning car wheels, which tends to abrade the membrane surface, and to pull or delaminate the membrane from the deck itself. Even when the cars are parked, substantial static loading is placed on the portions of the membrane under the car wheels. Over extended periods of time, this loading tends to "compression set" or make a depression in the membrane surface. Moreover, the membrane system is subjected to extremely high load forces resultant when women wearing sharp, pointed heels walk to and from their cars. For example, a 150 pound woman wearing ¼ inch spike heels exerts a force of well over 3,000 pounds per square inch at the point of contact of the heels.

Still other forces are exerted on a waterproofing system covering a parking deck. For example, lubricating oils, grease, gasoline and automobile brake fluid all tend to leak onto the garage surface. A waterproofing membrane system must resist the softening or degrading effects of these fluids. Further, the system should be resistant to fire that may be occasioned by an exploding gasoline tank or other cause.

Since a rooftop parking deck generally is of large area, significant expansion and contraction of the deck substrate is to be expected as a result of atmospheric temperature changes. It is important that a waterproofing membrane system be capable of tolerating such substrate dimensional changes without tearing or loss of adhesion to the decking surface.

Moreover, daily and seasonal thermal cycling often causes cracks or faults to develop and extend progressively along regions of stress in the concrete deck substrate. A membrane system must be capable of bridging such cracks or faults without rupture, to insure the integrity and continued leakproof character of the system. This requirement is particularly acute in geographic regions subject to earthquakes, since the rolling or undulation of the deck substrate during an earthquake places a considerable burden on the capabilities of the membrane to tolerate movement or cracking of the substrate.

Yet another requirement of such decking membranes is that of repairability. Thus, should pinholes or cuts occur in the membrane system, it is important that these be readily repairable at low cost, without the requirement for removing large portions of the membrane, and with complete, water-tight integrity of the resultant repaired membrane.

The system requirements just described by no means are limited to the waterproofing of rooftop parking decks. Thus, similar problems are encountered when providing waterproof coverings for other structural surfaces such as, but not limited to, prefabricated building walls, architectural or shipboard decking, the interior or exterior of tanks used for storage of fluids, food stuffs or the like, and other surfaces requiring a fluid impervious barrier.

For none of these applications have satisfactory materials been available in the past. Thus, roofing usually has been waterproofed by providing a tar paper layer covered with asphalt or pitch. While such a technique is adequate for preventing leakage, it is unacceptable for applications in which the waterproofing material is exposed to substantial mechanical forces.

A much more satisfactory approach to the problem is discussed in U. S. Pat. No. 3,475,260 to W. S. Stokes. This approach involves use of a membrane system including a backer sheet of fluid leakproof thermoplastic film to which is bonded an elastomeric layer of incompletely cured rubber. Such a two-layer membrane system, particularly when utilized with the laminated joint structure set forth in detail in the aforesaid patent, provides a most acceptable fluid leakage barrier for tank interiors and the like applications wherein the membrane system is not subjected to substantial mechanical forces.

These and other shortcomings of the prior art are overcome by the inventive membrane system which may easily be installed on concrete, wood, steel or other surfaces to provide a waterproof covering which is resistive to heavy compressive loading or abrasive forces. The membrane system is not degraded by the effect of oils, greases, gasoline and the like, is easily repaired, and is capable of withstanding considerable expansion, contraction, or cracking of the architectural substrate without fissure or damage to the membrane. Further, the membrane system is self-gasketing and entirely free from the problem of delamination caused by fluid leaking beneath a portion of the membrane.

SUMMARY OF THE INVENTION

In accordance with the present invention there is provided a leakproof membrane system including an outer sheet of fluid impervious, compression set resistant, synthetic polymer resin, a synthetic fiber scrim completely embedded within the outer sheet, and elastomeric layer coextensive with and adhesively bonded to the outer sheet. The elastomeric layer comprises an oriented rubber having preferred resilience within the plane of the layer.

In a preferred embodiment, the outer sheet comprises a polyvinyl chloride formulation including a polymeric plasticizer, epoxy resin, a cadmium barium stabilizer, and other additives. A scrim of nylon, Dacron or polyester is fusion bonded between two layers of the polyvinyl chloride to form a unitary outer sheet which is fluid impervious, and which is capable of withstanding very high static or dynamic loading without tearing and without exhibiting "compression set."

The elastomeric layer preferably comprises a polychloroprene (neoprene) rubber together with an accelerator to give vulcanization on curing, and other additives. The rubber is calendered onto the outer sheet so as to result in orientation or crystallization of the rubber within the plane of the elastomeric layer. The rubber thus exhibits extreme resilience within the plane of the elastomeric layer, and more important, provides a "slip-sheet" effect, isolating the membrane outer sheet from movement or cracking of the substrate to which the membrane system is applied.

The elastomeric layer is bonded to the outer sheet by means of an adhesive based on a neoprene polymer combined with a suitable phenolic resin to add adhesion to the vinyl surface. Use of a solvent system including tetrahydrafuran further improves adhesion to the vinyl sheeting by its solvating action on the vinyl surface.

When appropriately adhesively bonded to an architectural or other substrate, the membrane system completely prevents fluid leakage to the substrate. Further, movement or cracking of the substrate is isolated from the membrane outer sheet by the "slip-sheet" effect of the oriented elastomeric layer.

Thus it is an object of the present invention to provide an improved, leakproof membrane system.

Another object of the present invention is to provide a fluid impervious membrane system comprising an outer sheet of synthetic polymer resin, a synthetic fiber scrim completely imbedded within the outer sheet, and an elastomeric layer bonded to the outer sheet.

It is another object of the present invention to provide a membrane system including a "compression set" resistant, synthetic polymer film and a rubber layer bonded to the film, the rubber having preferred resilience within the plane of the layer.

Still another object of the present invention is to provide a fluid impervious membrane for covering an architectural substrate, the membrane being isolated from the substrate by a layer of rubber exhibiting a "slip-sheet" effect.

It is yet another object of the present invention to provide improved materials for use in a multi-layer laminated membrane system.

A further object of the present invention is to provide a laminated composite comprising an outer sheet of modified polyvinyl chloride, a synthetic fiber scrim completely imbedded within the outer sheet, and an oriented polychloroprene elastomeric layer adhesively bonded to the outer sheet.

Yet a further object of the present invention is to provide a mechanical structure incorporating a compression set resistant synthetic polymer film to which is bonded a rubber layer having preferred resilience within the plane of the layer.

BRIEF DESCRIPTION OF THE DRAWINGS

Still other objects, features and attendant advantages of the present invention will become apparent to those skilled in the art from a description of the preferred embodiments constructed in accordance therewith, taken in conjunction with the accompanying drawings, wherein like numerals designate like parts in the several figures, and wherein.

DESCRIPTION OF THE PREFERRED EMBODIMENTS

Figure 1:
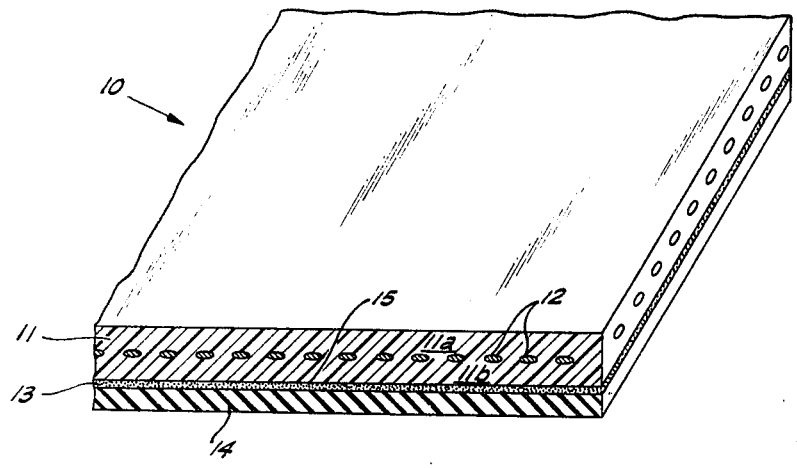
FIG. 1 is a greatly enlarged, fragmentary sectional view of a membrane system in accordance with the present invention.

Referring now to the drawings, and particularly to FIG. 1 thereof, there is shown a small portion of a membrane system in accordance with the present invention. As seen therein, a membrane system 10 comprises an outer sheet 11 of fluid impervious, flexible, compression-set resistant synthetic polymer resin. Completely imbedded within sheet 11 is a scrim 12 of synthetic resin fiber. Bonded to outer sheet 11, by means of an adhesive 13, is an elastomeric layer 14 comprising a rubber oriented to exhibit preferred resilience within the plane of layer 14.

As noted, FIG. 1 is greatly enlarged, and the actual overall thickness of membrane system 10 is on the order of from about 0.015 inches to about 0.080 inches. Of this total thickness, elastomeric layer 14 itself accounts for between about 0.007 inches and about 0.070 inches. While having a very small thickness, membrane system 10 typically will have a very large surface area. Thus, membrane system 10 may be manufactured in rolls which are several feet wide by several hundred feet long.

In a typical manufacturing process, outer sheet 11 initially may be formed of two independent layers, generally designated 11a and 11b in FIG. 1. Scrim 12, which preferably is coextensive with outer layer 11, then may be sandwiched between layers 11a and 11b and the composite heated to above the melting temperature of the resin used for outer sheet 11, but below the melting temperature of the material of scrim 12. This operation, which may be accomplished in a heated calender, fusion bonds layers 11a and 11b together, to form the unitary, scrim-embedded outer sheet 11 illustrated in FIG. 1.

Elastomeric layer 14 may be applied to outer sheet 11 using a conventional three-roll calender. In such a calender, the upper two rollers rotate in opposite directions and act as a mill into the nip of which is fed the rubber composite used to form elastomeric layer 14. Adhesive 13 is precoated onto bottom surface 15 of outer sheet 11, and the adhesive coated sheet fed between the lower two rollers of the three-roll calender. The blanket of rubber which forms around the central roll of the calender then becomes bound to adhesive 13 to complete fabrication of membrane system 10. Such a fabrication technique permits membrane system 10 to be formed in extremely long webs which immediately may be wound into rolls for convenience of handling.

The calendering process by which elastomeric layer 14 is applied also appears to cause an orientation or preferred direction of crystallization of the rubber forming elastomeric layer 14. While the exact mechanism is unclear, this orientation or preferred crystallization results in a non-isotropic resilience of layer 14, and permits layer 14 to exhibit the "slip-sheet" effect described hereinbelow in conjunction with FIG. 2.

The rubber forming elastomeric layer 14 may exhibit resilient elongation in the direction of the web of membrane system 10 to as much as several hundred times its original length. Thus, depending on the particular formulation employed, the rubber of elastomeric layer 14 may be capable of resilient elongation up to 700 times its original length when stretched in the direction of the web of membrane system 10 (and in the plane of layer 14). The same rubber may be capable of resilient elongation to about 250 times its original length in a direction transverse to the web of membrane system 10, but still within the plane of layer 14.

Figure 2:
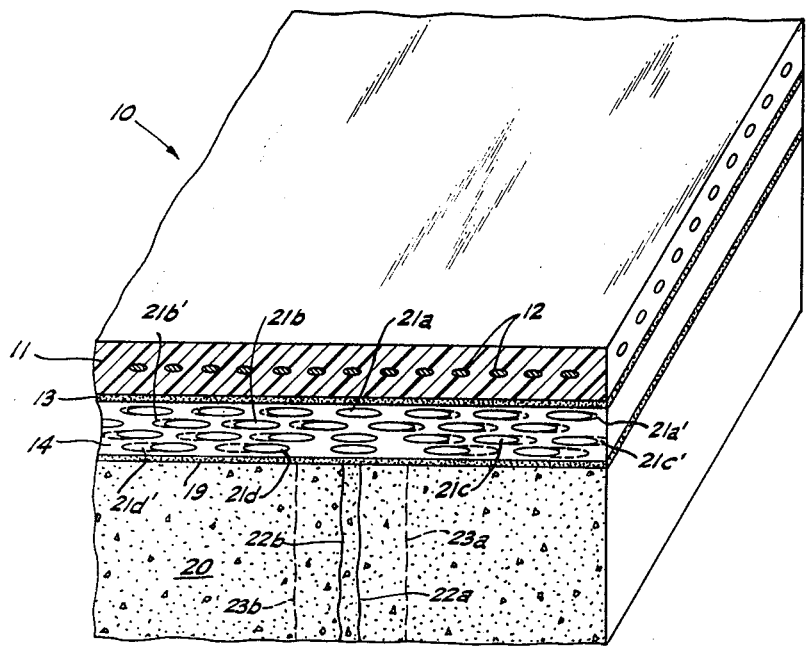
FIG. 2 is a greatly enlarged, fragmentary sectional view of the inventive membrane system adhesively bonded to a substrate; the figure illustrates the "slip-sheet" effect of the elastomeric layer of the membrane system.

Membrane system 10 may be employed for waterproofing a structure by bonding the system to a surface of the structure to be protected. By way of example, FIG. 2 shows membrane system 10 bonded by means of an adhesive 19 to a concrete substrate 20. Of course, the invention is not limited to use on concrete surfaces, and membrane system 10 may be employed on any reasonably rigid surface, including, but not limited to wood, steel and other metals, compacted earth and so forth. When surface areas larger than the width of a single web of membrane system 10 are to be covered, adjacent webs of the membrane system may be used, possibly connected by lap or butt joints of the type set forth in the above-mentioned U. S. Pat. No. 3,475,260 to W. S. Stokes.

The oriented characteristic of the rubber employed permits elastomeric layer 14 to exhibit a "slip-sheet" effect. This "slip-sheet" effect, which allows membrane system 10 to tolerate considerable expansion, contraction and/or cracking of the substrate to which the membrane system is applied, is illustrated in FIG. 2.

Referring to FIG. 2, the generally oval shaped elements 21a, 21b, 21c, 21d schematically represent planes in the apparently crystalline structure of oriented rubber elastomeric layer 14. Although four crystalline planes or layers are illustrated, this is not to imply that exactly four planes exist in the actual elastomeric layer 14; there may be fewer or considerably more of such crystalline planes. Moreover, the actual crystalline planes may be ill-defined.

The layers 21a – 21d of oriented rubber in elastomeric layer 14 exhibit considerable resilience parallel to the web of membrane system 10, while exerting minimal transverse force between adjacent layers.

This effect is illustrated diagramatically in FIG. 2 in conjunction with thermal expansion and contraction of the concrete substrate 20. Thus, the solid lines 22a and 22b represent generally vertical locii of points within substrate 20 situated at a typical cold temperature separation distance. With an increase in temperature, concrete substrate 20 will expand, and the same locii of points will separate to the distance illustrated by phantom lines 23a and 23b.

If the coefficient of expansion of concrete is greater than that of outer sheet 11, as substrate 20 thermally expands or contracts the substrate will pull with it the lower plane 21d of elastomeric layer 14. This is illustrated schematically in FIG. 2 by the elements 21d' shown in phantom. Because of the oriented characteristic and preferred resilience of elastomeric layer 14, plane 21d can tolerate extreme elongation without exceeding the elastic limit of the rubber. Moreover, since there is relatively little transverse force exhibited between planes 21a–21d, expansion of plane 21d causes relatively less expansion of plane 21c. Thus, expansion of concrete substrate 20 causes planes 21d–21a to expand by relatively decreasing amounts, as indicated by phantom elements 21d'—21a' in FIG. 2. The expansion of plane 21a is much more closely related to expansion of outer sheet 11 than to expansion of substrate 20.

Thus it may be seen that outer sheet 11 is isolated from movement of substrate 20 by the relative lateral movement (slip) between planes (sheets) 21a–21d of oriented rubber elastomeric layer 14. It is this characteristic which herein is called the "slip-sheet" effect.

The "slip-sheet" effect also is important in the event that substrate 20 should develop a crack or fissure. In this case, lines 22a, 22b may represent the fissure when formed, and lines 23a, 23b represent the increased fissure size resulting from thermal expansion or mechanical shifting of substrate 20. The "slip-sheet" effect of elastomeric layer 14 is capable of bridging the gap or fissure, even though the gap size should increase many fold, with minimal transmission of the resultant lateral force to outer sheet 11.

Preferably, outer sheet 11 comprises polyvinyl chloride together with appropriate additives as discussed below. Alternatively, synthetic polymer resins such as chlorosulphonated polyethylene, polypropylene, long chain ethylene propylene, or high molecular weight polyethylene may be used for outer sheet 11.

It is desirable that appropriate stabilizers be included with the resin to prevent degradation upon exposure of outer sheet 11 to heat, oxygen, sunlight and the like. In addition, a plasticizer preferrably is employed to enhance the weathering properties and toughness of outer sheet 11. Other additives, such as epoxy resin may be used to further improve the toughness and abrasion resistance of membrane system 10.

The following Table I indicates an exemplary formulation for outer sheet 11 based on polyvinyl chloride. Included in the table are acceptable ranges for each ingredient, as well as a preferred formulation, all set forth in parts by weight of the constituents.

TABLE I

| Ingredient | Preferred Amount | Acceptable Range |
|---|---|---|
| 1. Vinyl Chloride Polymer | 59.00 | 40.00–60.00 |
| 2. Polymeric Plasticizer | 26.66 | 20.00–35.00 |
| 3. Aluminum Silicate | 15.00 | 10.00–30.00 |
| 4. Epoxy Resin | 9.16 | 5.00–15.00 |
| 5. Cadmium Barium Stabilizer | 1.50 | 1.00–3.00 |
| 6. Zinc Stabilizer | 0.16 | 0.10–1.50 |
| 7. Organic Chelate | 0.33 | 0.20–1.00 |
| 8. Stearic Acid | 0.04 | 0.02–0.07 |
| 9. Titanium Dioxide | 3.33 | 1.00–5.00 |
| 10. Black Iron Oxide | 0.19 | 0–2.00 |
| 11. Ultramarine Blue | 0.04 | 0–1.00 |
| 12. Yellow Iron Oxide | 0.02 | 0–0.06 |
| Total: | 115.43 | |

The polymeric plasticizer included in the formulation of Table I typically may comprise polypropylene adipate, a polymer of relatively low molecular weight which has good leach resistant properties. This plasticizer, together with the epoxy resin impart extreme toughness to outer sheet 11. The aluminum silicate is a reinforcing agent which improves abrasion and tear resistance of the sheet. The titanium dioxide acts as an ultraviolet screen and colorant, and together with the polymeric plasticizer and the high or medium-high molecular weight vinyl chloride polymer give outer sheet 11 excellent weathering properties. The cadmium barium stabilizer further acts to prevent degradation of outer sheet 11 upon exposure to heat, oxygen and sunlight. Use of a cadmium barium stabilizer rather than a lead stabilizer permits membrane system 10 to be employed on the interior surface of tanks used for the storage of foodstuffs.

The preferred formulation set forth in Table I provides an outer layer 11 which has extremely good toughness, weathering properties and resistance to abrasion, "compression-set" and other physical abuse. The material is not softened or degraded by lubricating oils, greases, gasoline or automotive brake fluids spilled thereon.

Scrim 12 (FIG. 1) preferably comprises nylon, Dacron or polyester. These materials exhibit high tensile strength on tear, but also exhibit sufficient elongation so as not to be ruptured should outer layer 11 be stretched or distended, as by the force of a spinning automobile tire.

Preferably, scrim 12 is placed near the middle or toward the lower portion of outer sheet 11. It has been found that if scrim 12 is placed too close to the upper surface of outer sheet 11, some "creep" results in membrane system 10, and there is a decrease in the frictional resistance to the high torque spinning car wheels.

Scrim 12 also acts to resist dimensional changes in outer sheet 11. Thus while polyvinyl chloride systems typically show long-term shrinkage of from 3 to 10 percent, the presence of scrim 12 bonded within outer sheet 11 significantly decreases the effective long-term shrinkage of this sheet. Scrim cloth 12 also prevents the opening of seams or other large ruptures within membrane system 10.

As an alternative material, fiberglass may be used for scrim 12. However, glass has almost zero elongation, and any load placed on membrane system 10 which tends to elongate outer sheet 11 may result in tearing of a fiberglass scrim 12. Thus, use of fiberglass for scrim 12 is preferred for applications such as waterproofing exterior vertical building walls, wherein the dimensional stability added by the glass is desirable, but wherein membrane system 10 is not exposed to extreme elongation forces.

Elastomeric layer 14 preferably is formed of polychloroprene (neoprene) rubber, however other materials such as oriented acrylonitrile or chlorosulphonated polyethylene (Hypalon) also may be employed. A minimum thickness of about 0.007 inches is desirable for elastomeric layer 14, to provide sufficient "slip-sheet" effect as described hereinabove. Such minimum thickness also insures that the rubber will be in continuous contact with the substrate. Further, thicknesses of less than about 0.007 inches are difficult to calender.

On the other hand, it is desirable that elastomeric layer 14 not exceed a maximum thickness of about 0.070 inches. If the thickness is considerably greater than this, there is a tendency for membrane system 10 to exhibit "creep" under extreme stress, a problem which could result in rupture or delamination of outer sheet 11. The preferred thickness range for elastomeric layer 14 is from about 0.008 inches to about 0.050 inches.

Table II below shows acceptable formulations based on polychloroprene for elastomeric layer 14. Acceptable ranges for each ingredient are indicated, together with a preferred formulation indicated in parts by weight of each constituent.

TABLE II

| Ingredient | Preferred Range | Acceptable Range |
| --- | --- | --- |
| 1. Polychloroprene | 45.0 | 30.00–60.00 |
| 2. Magnesium Oxide | 2.0 | 1.00–4.00 |
| 3. Zinc Oxide | 3.0 | 2.00–6.00 |
| 4. Antioxidant | 1.5 | 1.00–2.00 |
| 5. Accelerator | 1.0 | 0.50–2.00 |
| 6. Stearic Acid | 0.5 | 0–0.95 |
| 7. Carbon Black | 25.0 | 10.00–35.00 |
| 8. Calcined Clay | 22.0 | 15.00–50.00 |
| 9. Calcium Carbonate | 16.0 | 10.00–30.00 |
| 10. Process Oil | 4.0 | 4.00–15.00 |
| | Total: 120.0 | |

Zinc oxide, together with stearic acid and an accelerator are included in the formulations of Table I to produce vulcanization of the rubber. The antioxidant reduces long term degradation of the rubber since oxidation occurs preferentially on the antioxident rather than on the polychloroprene. Carbon black is included to prevent degradation due to ultraviolet light, and, together with the calcined clay, enhances the tensile and tear strength and abrasion resistance of the material.

The preferred polychloroprene rubber formulation set forth in Table II readily may be calendered onto outer sheet 11, as described generally hereinabove, to provide an elastomeric layer 14 having excellent "slip-sheet" characteristics. Further, the compound has good resistance to oils and the like, low "-tack," and good fire retardant properties which permit the inventive membrane system to comply with building and safety code requirements. The membrane system also meets insurance underwriter requirements for self-extinguishing, relatively non-flammable materials.

When elastomeric layer 14 comprises a polychloroprene rubber formulation such as that set forth in Table II, adhesive 13 (FIG. 1) may comprise a polychloroprene polymer modified with a suitable phenolic resin and other additives. Table III below shows acceptable formulations for the solids portion of such an adhesive, and indicates both acceptable ranges and preferred parts by weight of each ingredient.

TABLE III

| Ingredient | Preferred Range | Acceptable Range |
| --- | --- | --- |
| 1. Polychloroprene | 100 | 30.00–75.00 |
| 2. Zinc Oxide | 5 | 2.00–6.00 |
| 3. Magnesia | 4 | 2.00–5.00 |
| 4. Antioxidant | 2 | 1.00–2.50 |
| 5. Phenolic | 50 | 30.00–60.00 |
| 6. Red Iron Oxide | 4 | 3.00–6.00 |
| 7. Chlorinated Rubber | 5 | 2.00–7.00 |
| | Total: 170 | |

To prepare the adhesive, the polychloroprene initially is milled thoroughly to break down the polymer. The other ingredients then are added and mixed until a smooth consistency is achieved. The compound then is shredded and added to a suitable solvent system preferably containing tetrahydrafuran which improves adhesion to polyvinyl chloride outer sheet 11 by its solvating action on the vinyl surface.

An acceptable solvent system for use with the formulation of Table III may comprise 20 parts by weight toluene, 70 parts by weight of methylethyl ketone and 10 parts by weight of tetrahydrafuran. Sufficient solvent is used so that approximately 30 percent solids is present in the adhesive. With a greater concentration of solids, the same adhesive formulation also may be used to apply membrane system 10 to a substrate (i.e., as adhesive 19 shown in FIG. 2).

An embodiment of membrane system 10 was fabricated to include an outer sheet 11 having the preferred formation of Table I, a Dacron scrim 12, an oriented rubber elastomeric layer 14 having the preferred formulation of Table II, and an adhesive 13 having the preferred formulation of Table III. This membrane system was applied on a concrete deck work area of a large generator plant where it was exposed to heavy automotive and foot traffic, as well as to weathering and to various fluids such as grease, oil, gasoline and the like. The membrane system provided excellent waterproofing, and no fluid leakage to the substrate was noted over an extended period of time.

Fifteen 500-pound drums of turbine oil having sharp steel rims were stored atop membrane system 10 for 15 days and then removed. The heavy steel drums left a clearly visible impression on the membrane system. However, after 5 more days had elapsed, there was no visible impression of the steel drum rings, thus illustrating the excellent resistance to "compression-set" of the inventive membrane system. Further, there was no tendency of membrane system 10 to creep, wrinkle, abrade, tear or become delaminated despite considerable traffic across the surface of the membrane system. The "slip-sheet" effect of elastomeric layer 14 effectively compensated for expansion and contraction of the concrete substrate as a result of daily and seasonal changes in atmospheric temperature.

The preferred formulation of Table I results in an outer sheet 11 which is remarkably free of pinholes. However, should a pinhole or cut develop in outer sheet 11, fluids leaking through the pinhole or cut cannot seep beneath the remainder of membrane system 10. This results because elastomeric layer 14 acts as a gasket seal about the perimeter of the pinhole and cut. Accordingly, there is no tendency for membrane system 10 to pucker or become delaminated from the substrate as a result of water accumulation underneath the membrane system.

Pinholes or cuts in membrane system 10 readily can be repaired by using a vinyl welding solution of the type set forth in Table IV below.

TABLE IV

| Ingredient Solids Portion | Preferred Amount | Acceptable Range |
| --- | --- | --- |
| 1. Polyvinyl Chloride Resin | 100.00 | 100.00–125.00 |
| 2. Dioctyl Phthalate Plasticizer | 10.00 | 5.00–8.00 |
| 3. Barium-Cadimum Stabilizer | 1.00 | 0.50–1.50 |
| 4. Organic Chelate | 0.02 | 0.30–0.70 |
| | Total: 111.02 | |
| Solvent System | | |
| 1. Methyl Ethyl Ketone | 90 | 85.00–95.00 |
| 2. Isophrone | 10 | 15.00–5.00 |
| | Total: 100 | |

The solids are dissolved in the solvent system, the preferred concentration being about 30 percent solids. The formulation of Table I is a clear vinyl material which may be inserted into a pinhole or cut and which forms a chemical bond with the adjacent polyvinyl chloride outer sheet 11. The resultant repaired structure exhibits a fluid imperviousness which is substantially equal to that of the original membrane system.

Should a portion of membrane system 10 be gouged out, a repair readily may be effected in the following manner. An unused segment membrane system 10 slightly larger in size than the gouged area is placed atop the gouge, and the old and new membranes simultaneously double cut. The old outer sheet 11 is scraped from the double cut area, down to within elastomeric layer 14. A mastic, for example, a high solids version of the polychloroprene based adhesive of Table III, is spread over the exposed portion of elastomeric layer 14. The new membrane system segment is inserted within the double cut area, and is adhered in place by the mastic. The vinyl welding solution, such as that set forth in Table IV, then is applied about the periphery of the new segment to complete the repair. The repaired membrane system again exhibits all of the characteristics of the original system.

While the invention has been described with respect to the preferred physical embodiments constructed in accordance therewith, it should be apparent to those skilled in the art that various modifications and improvements may be made without departing from the scope and spirit of the invention. For example, although outer sheet 11 is described hereinabove as having a scrim embedded therein, the invention is not so limited. Thus, for applications in which optimum mechanical strength is not required, scrim 12 may be omitted; the "slip-sheet" effect provided by elastomeric layer 14 still will provide isolation of outer sheet 11 from mechanical forces exerted on the bottom surface of the elastomeric layer, parallel to the plane of the web.

I claim

1. A membrane system comprising:
   an outer sheet of fluid impervious, synthetic polymer resin,
   a synthetic fiber scrim imbedded completely within said outer sheet and,
   an elastomeric layer coextensive with said sheet, one surface of said layer being bonded to said sheet, said elastomeric layer comprising rubber having an oriented, generally planar crystalline structure, planes of said rubber being substantially independently, resiliently extensible parallel to said layer for isolating said outer sheet from forces exerted on the opposite surface of, and parallel to, said layer.

2. A membrane system as defined in claim 1 wherein said oriented rubber comprises one of polychloroprene, acrylonitrile, chlorosulphonated polyethylene, polypropylene and long chain ethylene propylene.

3. A membrane system as defined in claim 1 wherein said synthetic fiber scrim comprises one of nylon, polyethylene terephthalate, polyester and fiberglass.

4. A membrane system as defined in claim 1 wherein said synthetic polymer resin comprises one of polyvinyl chloride, chlorosulphonated polyethylene, polypropylene, long chain ethylene propylene and high molecular weight polyethylene.

5. A membrane system as defined in claim 1 wherein said elastomeric layer has a thickness of between about 0.007 and about 0.070 inches.

6. A membrane system as defined in claim 5, said membrane system having an overall thickness of between about 0.015 inches and about 0.080 inches.

7. A leakproof membrane system comprising:
   an outer sheet comprising polyvinyl chloride,
   a scrim completely imbedded within and substantially coextensive with said outer sheet, said scrim comprising one of nylon, polyethylene terephthalate, and polyester, and
   a polychloroprene elastomeric layer bonded to and substantially coextensive with said outer sheet.

8. In combination:
   an architectural substrate, and
   a leakproof membrane system as defined in claim 7 bonded to a surface of said substrate.

9. A membrane system as defined in claim 7 wherein the thickness of said elastomeric layer is from about 0.007 to about 0.070 inches, and wherein said polychloroprene has an oriented, generally planar crystalline structure, planes of said polychloroprene beging substantially independently, resiliently extensible parallel to said layer.

10. A membrane system as defined in claim 9 wherein said outer sheet polyvinyl chloride formulation comprises a polymeric plasticizer, a lead-free stabilizer, epoxy resin, and aluminum silicate, said ingredients enhancing the mechanical strength of said outer sheet.

11. A membrane system as defined in claim 9 wherein said elastomeric layer polychloroprene formulation includes a vulcanizer and calcined clay and carbon black to enhance the strength and abrasion resistance of said layer.

12. A membrane system as defined in claim 9 wherein said elastomeric layer is bonded to said outer sheet by means of an adhesive comprising polychloroprene, phenolic and zinc oxide in a solvent system containing tetrahydrafuran.

13. A membrane system comprising:
   a web of fluid impervious, compression-set resistant, synthetic polymer resin,
   a synthetic fiber scrim completely imbedded within said web, and
   an elastomeric layer coextensive with and bonded to said web, material of said elastomeric layer exhibiting preferred resilient elongation within the plane of said layer and longitudinal of said web.

14. A membrane system comprising:
   a web of fluid impervious, synthetic polymer resin, and
   an elastomeric layer coextensive with and bonded to said web, said layer comprising rubber having an oriented, generally planar crystalline structure, planes of said rubber being substantially independently, resiliently extensible parallel to said web.

* * * * *